No. 867,958. PATENTED OCT. 15, 1907.
J. V. N. DORR.
DECANTING APPARATUS.
APPLICATION FILED FEB. 26, 1907.
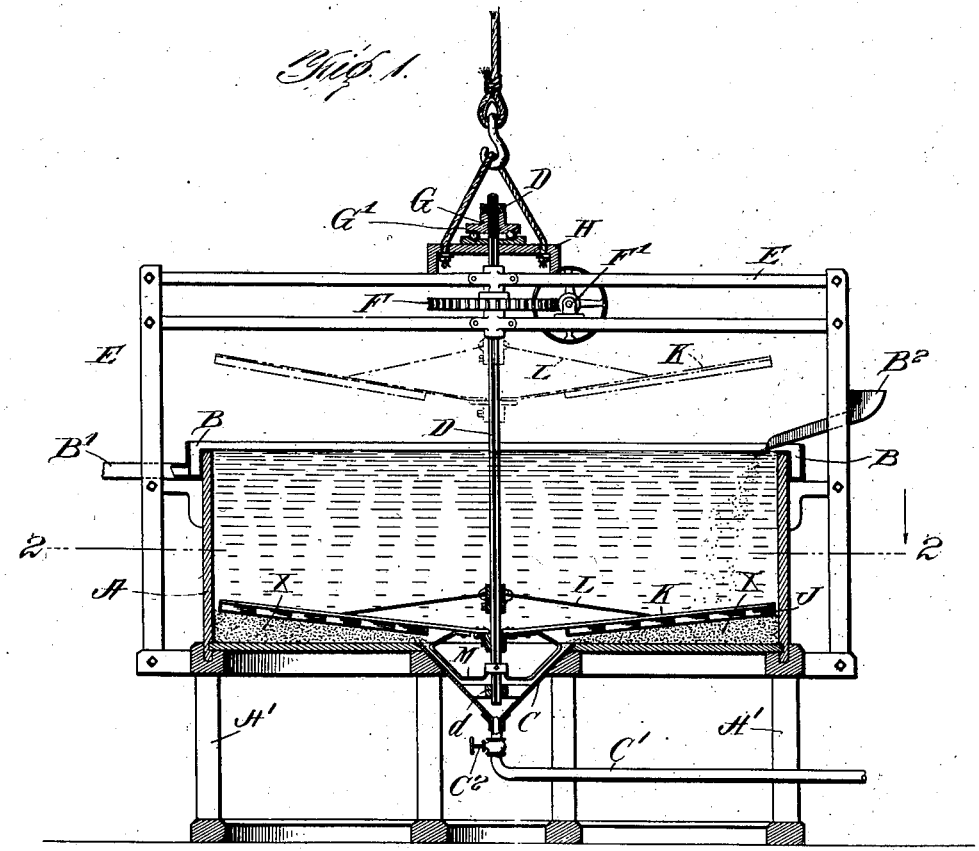
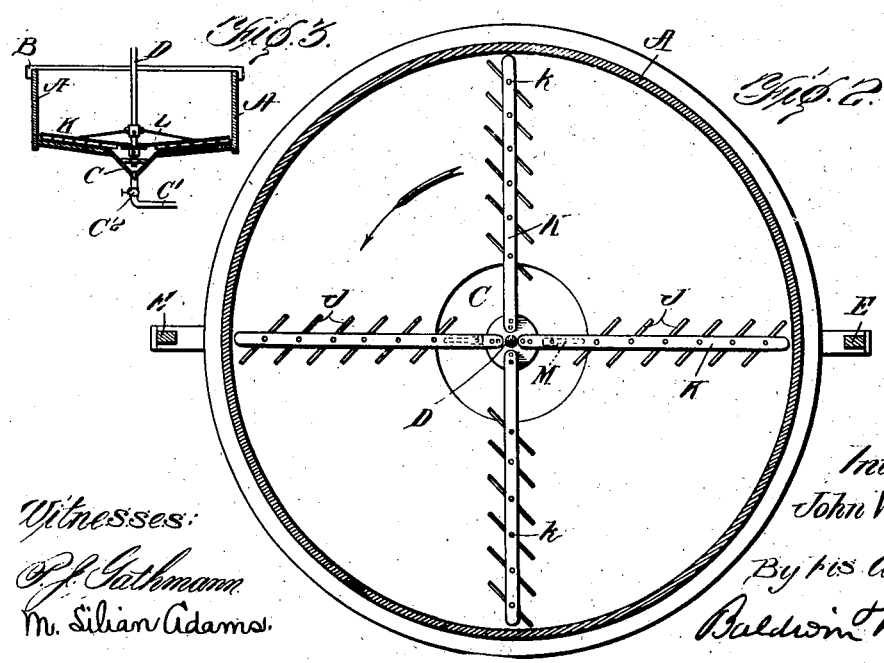
Witnesses:
P. J. Gathmann
M. Lilian Adams.
Inventor:
John V. N. Dorr.
By his Attorneys,
Baldwin Wight

UNITED STATES PATENT OFFICE.

JOHN V. N. DORR, OF LEAD, SOUTH DAKOTA.

DECANTING APPARATUS.

No. 867,958.  Specification of Letters Patent.  Patented Oct. 15, 1907.

Application filed February 26, 1907. Serial No. 359,397.

*To all whom it may concern:*

Be it known that I, JOHN V. N. DORR, a citizen of the United States, residing in the city of Lead, in the county of Lawrence and State of South Dakota, have invented certain new and useful Improvements in Decanting Apparatus, of which the following is a specification.

In the wet treatment or ores, as by the cyanid process, the pulp passing from the ore pulverizers consists of cyanid solution or water, sands, and what are known as "slimes", consisting mainly of amorphous or flocculent matter derived from the argillaceous or earthy material of the ore. This pulp is usually first treated in classifiers to separate the sands from the slimes and the sands are conveyed to vats and leached in cyanid solution while the slimes are separately treated. It is not practicable to leach or otherwise treat the sands and slimes together, as the slimes so choke the material in the leaching vats as to prevent free percolation.

Slimes coming from a classifier of any sort usually consist of ten parts or more of solution or water to one of solids and as a preliminary step to all processes for the recovery of values from the slimes it is necessary to remove as much of the solution or water as possible and thicken the slimes until they carry between one part and three parts of liquid to one part of dry slimes. This separation is usually done in vats or cones by intermittent or continuous decantation. Intermittent decantation consists in filling a large vat with the thin pulp and then allowing it to stay until settled to thick pulp and drawing off the clear solution from the top after which the thickened slimes are usually sluiced with additional solution carrying no values into another vat and thereby diluted, whereupon they are allowed to settle again and the process repeated. For this work flat bottomed vats are commonly used as the solid slimes are washed out by the additional water or solution used. In intermittent decantation, much time is lost in recovering the last portion of the solution, during which time only a small part of the decanting vessel is utilized, making a large installation necessary for a comparatively small amount of work. In continuous decantation, on the other hand, either large cones are used or a flat bottomed tank is allowed to fill up with slimes until it forms a natural cone. Thickened slimes are fed into it continuously and clear solution overflows from the top of the vat at all times, while the thickened slimes are drawn out from the bottom continuously, or at comparatively short intervals. When single or multiple cones or vessels having conical bottoms have been employed for continuous decantation, it has been found difficult to secure uniform and continuous working owing to the tendency of the solids to collect on the slopes and then suddenly slide down towards the discharge opening of the vessel, thereby agitating the partially subsided material and choking the discharge opening unless an extremely large amount of the liquid desired to be separated is allowed to go out with the solids and even this expedient is not always successful, especially when the slimes are in cyanid solutions where the slimes tend to flocculate and solidify, thus requiring the attendant to scrape up the material to prevent the cone from filling with solid slimes and reducing the settling capacity to a great extent.

The object of my invention is to separate by a decanting process, slimes and similar material from the liquid containing them by a rapid and efficient operation.

According to my invention, I provide a decanting vessel or subsidence tank to which the liquid carrying the slimes is continuously fed and which is provided at the top with a launder into which the liquid decants while the solids or slimes subside or become thickened by gravity. A discharge opening is formed in the bottom of the tank and flights or scrapers are moved over the thickened material and direct it gently and continuously towards the discharge opening of the decanting vessel so as not to interfere with the subsidence of the incoming material but prevent it settling to the solid condition.

The bottom of the tank may be flat or horizontal or it may be slightly inclined towards the discharge opening. Preferably I provide the vessel with a flat or horizontal bottom and allow the material to pile up thereon to form a bed which receives the material as fast as it is deposited from the incoming pulp.

Each scraper preferably comprises an arm carrying a series of scraper plates or flights and each such scraper arm is preferably arranged to extend radially in an upwardly and outwardly inclined line from the discharge opening toward the side of the tank and the scraper plates or flights are set at such an angle to the arm as, when the arm is rotated, to scrape the thickening material off from the inclined top of the slime bed and move it into the discharge opening without agitating the liquid or interfering with the settling of material therefrom.

The discharge opening is provided with a cone or hopper which receives the slimes which latter may be drawn off from the bottom of the hopper either continuously or intermittently without drawing off much of the liquid.

The scrapers are carried by devices which can be raised and lowered readily to entirely remove the scrapers from the settling vessel if desired or to adjust them to any desired elevation.

The scrapers may be placed at any desired angle with reference to the discharge opening.

In the accompanying drawings: Figure 1 shows a vertical central section through a decanting apparatus embodying my improvements. Fig. 2 shows a sectional plan thereof on the line 2—2 of Fig. 1. Fig. 3 illustrates a modification.

The tank or vessel, A, is preferably made of large diameter, but is relatively shallow. For instance, it may have a diameter of 35 ft., while its depth need not be over 12 ft. Such dimensions have proved correct and efficient in practice, but I have also done good work with a tank having a depth of only 6 ft. A launder, B, is provided at the upper edge of the vessel. Preferably this is made annular, as shown, and is provided with a discharge pipe, B'. The liquid containing the slimes is fed in through a spout, B², or it may be fed in any other suitable way. Any suitable frame, A', may be employed to support the vessel, A.

A discharge opening is provided in the center of the tank, which is of suitable dimensions and is provided with a cone, C, extending downwardly from the opening and connected with a pipe, C', provided with a valve, C². A vertical shaft, D, is arranged centrally in the decanting vessel, its lower end extending through a frame, d, while its upper end extends through guides in a superstructure or upper frame, E. The shaft, D, has a tongue and groove connection with a worm wheel, F, mounted in stationary bearings in the frame, E, and driven by a worm, F', which may be operated in any suitable way either by hand or by power. The connection between the shaft, D, and the wheel, F, is such that the shaft may be raised or lowered to any desired extent, but is made to revolve with the wheel when the latter is rotated. At its upper end the shaft, D, is screw-threaded and carries a nut, D', below which is arranged a bearing-block, G, having a ball-bearing, G', on a part, H, resting on the frame, E. Any suitable means may be connected with the part, H, for raising and lowering the shaft.

The bottom of the decanting vessel may be flat or horizontal, as shown in Fig. 1, or it may be inclined as shown in Fig. 3. Where the bottom of the decanting vessel is flat or horizontal or has a gradual incline, it is necessary to provide some means for scraping the deposited material from the bottom and directing it towards the discharge opening of the vessel. The form of scraper which I prefer is that illustrated.

In general each scraper comprises a scraper arm extending upwardly and outwardly from the center of the discharge opening toward the side of the tank in a radial line and carrying a series of scraper plates or flights which are set at such an angle to the arm which carries them as, when the arm is rotated, to cause the thickening material to be scraped off from the inclined top of the slime bed and moved into the discharge opening without agitating the liquid or interfering with the settling of material therefrom.

I preferably employ four radial series of flights but this number may be varied. In the particular arrangement shown, each series of flights, J, is carried by a radial arm, K, attached to the vertical shaft, D. Each flight may be so connected with its arm at k as to be adjusted to the desired angle and the arms may be adjusted to any desired incline. Preferably each arm is connected at a point between its ends with the vertical shaft by an upwardly inclined brace-rod, L, which may be secured to the shaft in the manner shown and may be adjusted thereon to correspond with the inclination of the arm.

The scrapers may be arranged on horizontal arms so as to scrape the material from the horizontal bottom of the decanting vessel, but preferably I allow the slimes to collect and form a bed, X, on the bottom of the vessel and incline the scrapers upwardly and outwardly in the manner before specified and as illustrated in Fig. 1, so as to form a bed of slime which increases in depth outwardly from the central discharge opening, forming an inclined upper surface sloping downwardly towards the discharge opening. The scrapers remove the slime from the top of this bed and direct it towards the center of the tank. These scrapers are moved very slowly. In a tank of the dimensions before specified, viz: one 35 ft. in diameter, the scrapers are preferably made to revolve one-fifth of a revolution per minute. This will serve to remove the slime from the bed fast enough but without causing any such agitation in the liquid as would interfere with the subsidence of the contained solid material.

In order to prevent solid matter from adhering to the cone, C, I may provide one or more scrapers, M, which revolve with the scrapers, J, and act upon the cone in the manner clearly indicated. The thick pulp received by the cone, C, is allowed to accumulate therein and is removed at intervals or the discharge from the cone may be such as to be continuous, the thickness of the slime discharged being regulated by the amount drawn out through the discharge opening.

It will be understood that where decanting vessels with steeply inclined bottoms are employed, there is constant danger of an objectionable agitation of the liquids when the slimes, after accumulating on the steeply inclined bottoms, separate therefrom and fall rapidly down to the discharge opening of the vessel. Furthermore, in such apparatus, it is necessary to employ a plurality of decanting vessels in order to provide sufficient area for settling. In my present apparatus, the vessel is made very wide in order to provide such a settling area. The bottom may be made horizontal or only slightly inclined so as to avoid the agitation of the liquid by the falling of the slimes, while the slimes, as fast as required, are detached from the bottom of the vessel and moved downwardly to the discharge opening without interfering with the settling operation.

I have described my apparatus as being especially intended to separate slimes in a cyanid process, but it will be understood that this apparatus may be employed for separating other solid matter from liquid in various processes. I have shown the best form of apparatus known to me for carrying out my invention and one which has been found to be efficient in operation but the construction of the apparatus may be varied without departing from the novel features of my improvements.

The discharge opening and its cone or hopper may be considered merely a depression in the bottom of the decanting vessel into which the settled material passes and from which it may be, from time to time, removed in any suitable way.

I claim as my invention:—

1. A decanting apparatus comprising a relatively shallow settling or subsidence vessel of large diameter having at the top a launder for receiving the decanting liquid and a discharge opening in the bottom and a scraper mounted to move slowly over the bottom of the vessel and to carry the settled material towards the slimes discharge opening.

2. A decanting apparatus comprising a settling or subsidence vessel having at the top a launder for receiving the decanting liquid and a discharge opening in the bottom and a scraper comprising a radial arm and flights carried thereby disposed in series radially with reference to the discharge opening of the vessel and set at an angle with reference to the arm which carries them.

3. A decanting apparatus comprising a settling or subsidence vessel having at the top a launder for receiving the decanting liquid and a discharge opening in the bottom and a scraper comprising a radial arm and flights carried thereby disposed in a radial upwardly and outwardly inclined direction with reference to the discharge opening of the vessel and set at an angle with reference to the arm which carries them.

4. The combination of a decanting vessel having a launder at the top for receiving the decanting liquid and a depression in the bottom for the collection of slimes and a series of flights or scrapers revolving across the bottom of the vessel for scraping the material therefrom and moving it towards said depression.

5. The combination of a decanting vessel having a launder at the top for receiving the decanting liquid, a depression for receiving the solid material and a scraper comprising a series of flights moving across the bottom of the vessel and carrying the settled material towards the depression thereof.

6. The combination of a decanting vessel having a substantially flat bottom on which a bed of solid material is deposited and provided with a depression for receiving the settling material and a scraper comprising flights arranged in series radially in an upwardly and outwardly inclined direction and engaging the top of the bed to remove the thickened material therefrom and direct it towards the depression.

7. The combination of a decanting vessel having a substantially horizontal bottom and provided with a central depression for receiving the thickened material, a revolving scraper in said depression and a revolving scraper extending across the bottom of the tank for collecting the thick slime and moving it towards the central depression of the vessel.

In testimony whereof, I have hereunto subscribed my name.

JOHN V. N. DORR.

Witnesses:
WILLIAM MAXIMER, Jr.,
MARSHALL S. WALKER.